United States Patent
Poisner (10) Patent No.: US 7,051,137 B2
(45) Date of Patent: May 23, 2006

(54) EVENT DELIVERY

(75) Inventor: David I. Poisner, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 414 days.

(21) Appl. No.: 10/287,018

(22) Filed: Oct. 31, 2002

(65) Prior Publication Data

US 2004/0088460 A1 May 6, 2004

(51) Int. Cl.
*G06F 13/24* (2006.01)

(52) U.S. Cl. ............................. 710/260; 710/261

(58) Field of Classification Search ......... 710/260–266
See application file for complete search history.

(56) References Cited

U.S. PATENT DOCUMENTS

| | | | | |
|---|---|---|---|---|
| 5,627,842 | A | * | 5/1997 | Brown et al. ............... 714/727 |
| 6,169,442 | B1 | * | 1/2001 | Meehan et al. ............. 327/513 |
| 6,192,442 | B1 | | 2/2001 | Haren et al. |
| 6,460,105 | B1 | * | 10/2002 | Jones et al. ............... 710/268 |
| 6,757,759 | B1 | * | 6/2004 | Jones et al. ............... 710/100 |

FOREIGN PATENT DOCUMENTS

EP 0574991 A1 12/1993

OTHER PUBLICATIONS

Intel, Intel®82801BA I/O Controller Hub2 (ICH2) and Intel® 82801 BAM I/O Controller Hub 2 Mobile (ICH2-M) Datasheet, Oct. 2000, Order No.290687-002, Title page and pp. 5-41 through 5-63.
Intel, IA-32 Intel® Architecture Software Developer's Manual, vol. 3: System Programming Guide, 2001 Title page and pp. 7-14 through 7-48 and F-1 through F6.

* cited by examiner

*Primary Examiner*—Tim Vo
(74) *Attorney, Agent, or Firm*—Jeffrey B. Huter (57) ABSTRACT

Machine-readable media, methods, and apparatus are described for event deliver. In some embodiments, a virtual wire message is generated in response to an event. The virtual wire message may comprise a header providing destination and message type information. The virtual wire message may further comprise a payload providing status information for one or more events.

37 Claims, 6 Drawing Sheets

EVENT DELIVERY

BACKGROUND

Processors and chipsets typically use event signals to inform each other of events. To support event signals, processors and chipsets include pins for sending and receiving the event signals. There are a variety of independent reasons, however, to eliminate or reduce the number of event signals. One reason to eliminate or reduce the number of event signals is to reduce manufacturing costs associated with pins to receive and send event signals. Processors and chipsets tend to be pin-limited due to package or pad constraints. If the die of the processor or chipset is pad limited, then the extra pad results in a direct increase to the die size. Even if the die is core limited, freeing the pad allows the pad to be used for power or ground, and thus improves the package electrical characteristics.

Another reason is that routing of event signals is difficult in uni-processor environments and even more difficult in multi-processor environments. Physical routing of event signal lines often limits the size of the motherboard. Reducing the number of event signals and corresponding event signal lines may help in shrinking board sizes. Yet a further reason for eliminating or reducing event signals is to reduce costs associated with pull-up resistors and the power planes supporting event signals. Because of voltage differences between the chipset and processor, the chipset has typically required external pull-up resistors or an extra power plane to support legacy event signals between the different voltage domains. Removing legacy event signals may save power by eliminating or reducing the number of pull-up resistors or may reduce the number of power planes on the chipset.

A further reason for eliminating event signals is that elimination of these event signals would ease testing. Legacy event signals have typically been asynchronous from the perspective of the processor, because the processor and chipset have used different clock frequencies. The asynchronous nature of the event signals prevents using less costly, deterministic testing techniques to validate the platform.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques for delivering events that may enable the elimination or reduction of event signals in a computing device. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. However, the invention may be practiced without such specific details. In other instances, control structures, gate level circuits and full software instruction sequences have not been shown in detail in order not to obscure the invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Figure 1:
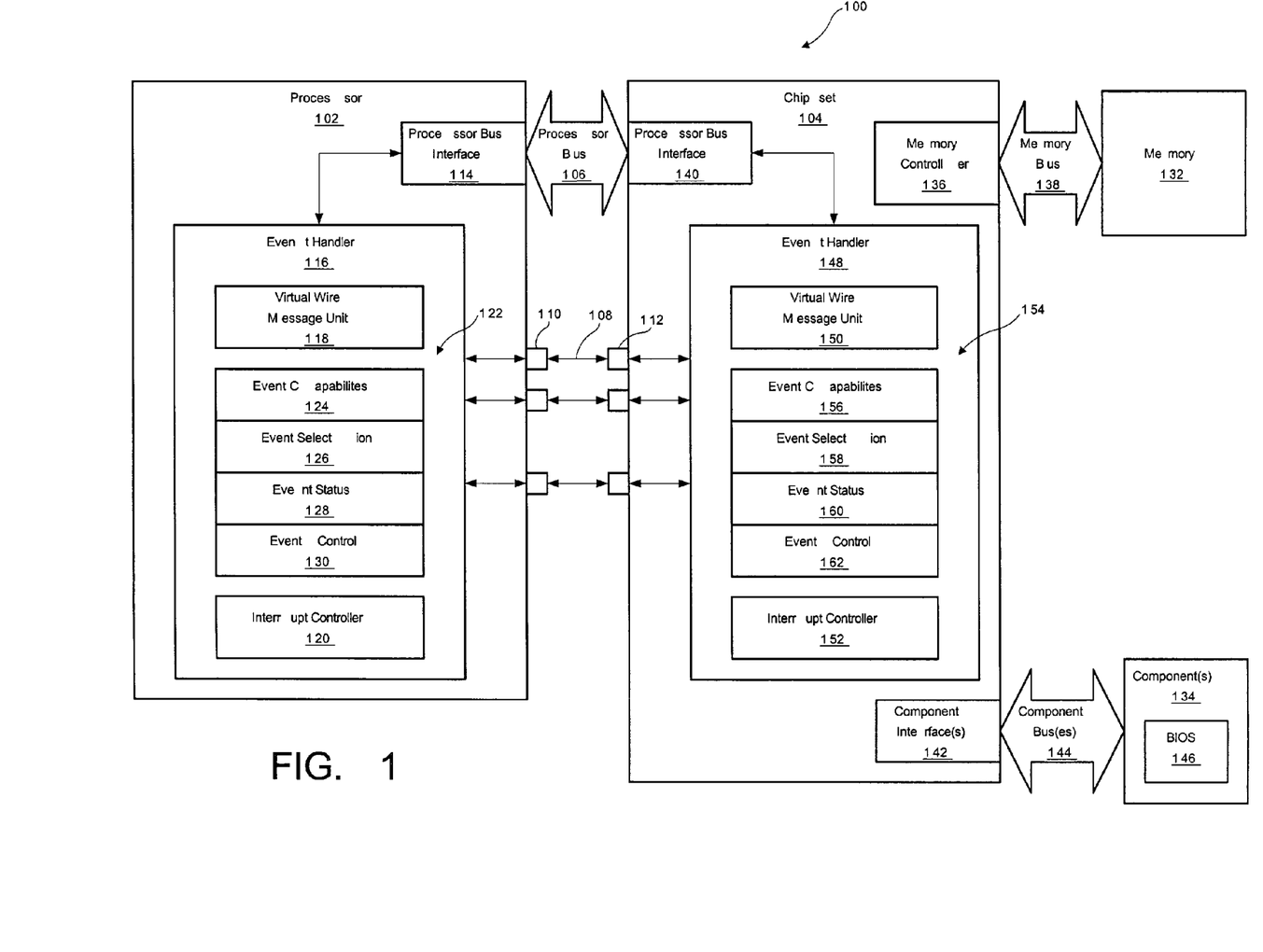
FIG. 1 illustrates an embodiment of a computing device.

An example embodiment of a computing device 100 is shown in FIG. 1. The computing device 100 may comprise a processor 102 that is coupled to a chipset 104 via a processor bus 106. In one embodiment, the processor 102 may be further coupled to the chipset 104 via event signal lines 108 coupled between one or more pins 110 of the processor 102 and one or more pins 112 of the chipset 104.

The processor 102 may comprise a processor bus interface 114 to issue or receive transactions on the processor bus 106. In one embodiment, the processor bus interface 114 may issue or receive on the processor bus 106 virtual wire messages that describe occurrences of one or more events. Further, the processor bus interface 114 may issue or receive on the processor bus 106 interrupt messages that describe occurrences of one or more interrupt events.

The processor 102 may further comprise an event handler 116 that is coupled to the processor bus 106 via the processor bus interface 114 and to the event signal lines 108 via the one or more processor pins 110. The event handler 116 may inform the chipset 104 of events generated or detected by the processor 102. Further, the event handler 116 may receive events generated or detected by the chipset 104.

In one embodiment, the event handler 116 comprises a virtual wire message unit 118 to generate virtual wire messages to send to the chipset 104. Further, the virtual wire message unit 118 may decode virtual wire messages received from the chipset 104. The virtual wire message unit 118 may send or receive a virtual wire message via the processor bus 106 and the processor bus interface 114. In another embodiment, the virtual wire message unit 118 may further send or receive a virtual wire message via a virtual wire message bus (not shown) that is separate from the processor bus 106.

The event handler 116 of the processor 102 may further comprise an interrupt controller 120. The interrupt controller 120 may generate an interrupt message to send to the chipset 104 and may decode an interrupt message received from the chipset 104. In one embodiment, the interrupt controller 120 may send or receive an interrupt message via the processor bus 106 and the processor bus interface 114. In another embodiment, the interrupt controller 120 may further send or receive an interrupt message via one or more processor pins 110 and associated event signal lines 108.

The event handler 116 of the processor 102 may further comprise one or more event registers 122. In one embodiment, the processor event registers 122 may comprise a capabilities register 124, a selection register 126, a status register 128, and a control register 130. The processor capabilities register 124 may indicate supported event handling capabilities of the processor 102. For example, the processor capabilities register 124 may indicate that the processor 102 supports handling: a first event (e.g. an INTR event) via a virtual wire message, an interrupt message, and an event signal associated with a processor pin 110; a second event (e.g. an FERR# event) via a virtual wire message and an event signal associated with a processor pin 110; and third event (e.g. an INIT event) via an event signal associated with a processor pin 110.

The selection register 126 of the processor event registers 122 may be used to select delivery mechanisms for associated events. For example, the selection register 126 may be used to select for: a first event (e.g. an INTR event) delivery via an interrupt message; a second event (e.g. an FERR# event) delivery via a virtual wire message; and a third event (e.g. an INIT event) delivery via an event signal associated with a processor pin 110 (e.g. an INIT pin).

The status register 128 and the control register 130 of the processor 102 may respectively provide event status and event control. In one embodiment, the status register 128 of the processor 102 may indicate which events are asserted (pending) and which events are deasserted (not pending). The control register 130 of the processor 102 may be used to enable events or disable events. Further, the control register 130 may be used to define events as level triggered or edge-triggered. In one embodiment, the control register 130 may support separately defining events as level triggered or edge-triggered.

Referring now to the chipset 104, the chipset 104 may generally interconnect the processor 102 with memory 132 and other components 134 (e.g. a mouse, keyboard, video controller, hard disk, floppy disk, firmware, etc.) via one or more packaged integrated circuit devices or chips that comprise the chipset 104. In one embodiment, the chipset 104 may comprise a memory controller 136 that is coupled to the memory 132 via a memory bus 138. The memory controller 136 may provide the processor 102 and other components 134 of the computing device 100 with access to storage locations of the memory 132. The memory 132 may comprise various memory devices providing addressable storage locations that the memory controller 136 may read data from or write data to. Further, the memory 132 may comprise one or more different types of memory devices such as, for example, dynamic random access memory (DRAM) devices, synchronous dynamic random access memory (SDRAM) devices, double data rate (DDR) SDRAM devices, quad data rate (QDR) SDRAM devices, or other volatile or non-volatile memory devices.

The chipset 104 may also comprise a processor bus interface 140 to communicate directly with the processor 102 via the processor bus 106. The chipset 104 may further comprise component interfaces 142 to communicate directly with the other components 134 via buses 144 such as, for example, peripheral component interconnect (PCI) buses, accelerated graphics port (AGP) buses, universal serial bus (USB) buses, low pin count (LPC) buses, or other I/O buses. In one embodiment, the other components 134 may comprise a basic input/output system (BIOS) firmware 146 coupled to the chipset 104 via a LPC bus. The BIOS 146 may provide instructions and routines that may be executed by the processor 102. In general, the routines provided by the BIOS 146 are used to access and initialize components of the computing device 100 prior to executing an operating system of the computing device 100. However, in some embodiments, the computing device 100 may execute the BIOS 146 routines to perform other tasks even after invoking execution of the operating system.

The chipset 104 may further comprise an event handler 148 that is coupled to the processor bus 106 via the processor bus interface 140 and to the event signal lines 108 via the one or more chipset pins 112. The event handler 148 may inform the processor 102 of events generated or detected by the chipset 104. Further, the event handler 148 may receive events generated or detected by the processor 102. In one embodiment, the event handler 148 comprises a virtual wire message unit 150 to generate virtual wire messages to send to the processor 102. Further, the virtual wire message unit 150 may decode virtual wire messages received from the processor 102.

The event handler 148 of the chipset 104 may further comprise an interrupt controller 152. The interrupt controller 152 may generate an interrupt message to send to the processor 102 and may decode an interrupt message received from the processor 102. In one embodiment, the interrupt controller 152 may send or receive an interrupt message via the processor bus 106 and the processor bus interface 140. In another embodiment, the interrupt controller 152 may further send or receive an interrupt message via one or more chipset pins 112 and associated event signal lines 108.

The event handler 148 of the chipset 104 may further comprise one or more event registers 154. In one embodiment, the chipset event registers 154 may comprise a capabilities register 156, a selection register 158, a status register 160, and a control register 162. The chipset capabilities register 156 may indicate supported event handling capabilities of the chipset 104. Further, the chipset selection register 158 may indicate delivery mechanism selections for the chipset 104 to deliver associated events.

The status register 160 and the control register 162 of the chipset 104 may respectively provide event status and event control. In one embodiment, the status register 160 of the chipset 104 may indicate which events are asserted and which events are deasserted. The control register 162 of the chipset 104 may be used to enable events or disable events. Further, the control register 162 may be used to define events as level triggered or edge-triggered.

Figure 2:
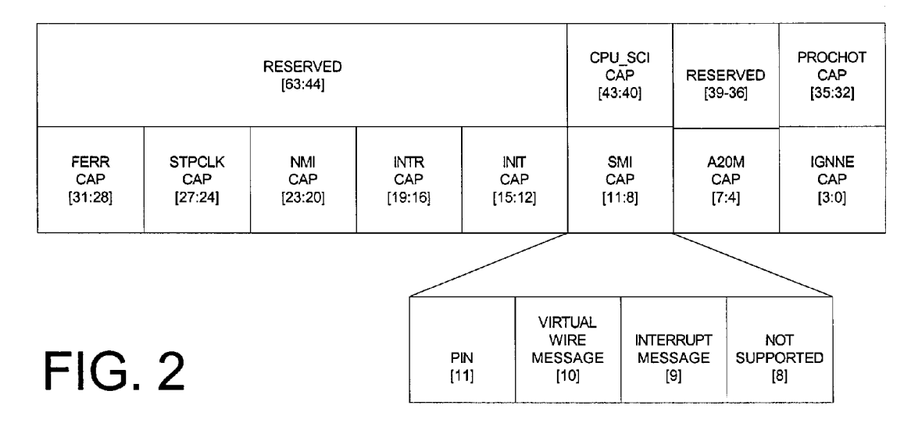
FIG. 2 illustrates an embodiment of a capabilities register of the computing device of FIG. 1.

Referring now to FIG. 2, an example embodiment of the capabilities registers is illustrated. In the embodiment illustrated, the processor capabilities register 124 and the chipset capabilities register 156 have the same format. However, in other embodiments, the processor capabilities register 124 may have a different format than the chipset capabilities register 156. Further, the processor capabilities register 124 may support reporting of the processor's capabilities associated with all, some, or additional events than those supported by the chipset capabilities register 156. Similarly, the chipset capabilities register 156 may support reporting the chipset's capabilities associated with all, some, or additional events than those supported by the processor capabilities register 124.

As illustrated, the chipset capabilities register 156 may comprise CAP fields for each event. In one embodiment, the capabilities register 156 may comprise an IGNNE CAP field, an A20M CAP field, a SMI CAP field, an INIT CAP field, an INTR CAP field, an NMI CAP field, a STPCLK CAP field, a FERR CAP field, a PROCHOT CAP field, and a CPU_SCI CAP field to respectively report the delivery capabilities of the chipset with respect to IGNNE events, A20M events, SMI events, INIT events, INTR events, NMI events, STPCLK events, FERR events, PROCHOT events, and CPU_SCI events. A brief description of the above events follows, but further details of one embodiment of the events may found in the IA-32 Intel Architecture Software Developer's Manual (2001) copies of which may be obtained from Intel Corporation, P.O. Box 7641, Mt. Prospect, Ill. 60056-7641.

The chipset 104 may report the INTR, NMI, SMI, and INIT events to inform the processor 102 of various types of interrupts. In particular, the chipset 104 may report an INTR event to indicate to the processor 102 that a normal interrupt (e.g. an Intel 8259 programmable interrupt controller interrupt) is asserted/deasserted. The chipset 104 may report a NMI event to indicate to the processor 102 that a non-maskable interrupt (NMI) is asserted/deasserted and may report a SMI event to indicate to the processor 102 that a system management interrupt (SMI) is asserted/deasserted. Further, the chipset 104 may report an INIT event to indicate to the processor 102 that the processor 102 is to initialize.

The chipset 104 may report an A20M event to indicate whether to mask the A20 signal line of the processor bus 106. The processor 102 may report a CPU_SCI event to cause the chipset 104 to assert a system control interrupt (SCI). In one embodiment, the CPU_SCI event causes a general-purpose event (GPE) bit to be set in the advanced configuration and power interface (ACPI) address space of the chipset 104. The chipset 104 may then assert a SCI interrupt in response to the setting of the GPE bit.

The chipset 104 and processor 102 may use the IGNNE and FERR events for floating point error handling. The processor 102 may report the FERR event to indicate to the chipset that the processor 102 has detected a floating point error. The chipset 104 may report the IGNNE event to indicate to the processor 102 that the processor 102 is to ignore a number error.

The chipset 104 and the processor 102 may use the STPCLK and PROCHOT events for power and thermal management. The chipset 104 may report the STPCLK event to indicate to the processor 102 that the processor 102 is to stop executing instructions and is to enter a power reduced state. The processor 102 may report the PROCHOT event to inform the chipset 104 that the processor 102 has exceeded a thermal limit. Further, the chipset 104 may report the PROCHOT event to throttle the processor 102 and reduce power consumption.

In one embodiment, each CAP field comprises four bits to encode the delivery capabilities of the chipset 104 for the associated event. In such an embodiment, a NOT SUPPORTED bit may indicate whether the chipset 104 supports delivery of the associated event, an INTERRUPT MESSAGE bit may indicate whether the chipset 104 supports delivery of the associated event via an interrupt message, a VIRTUAL WIRE MESSAGE bit may indicate whether the chipset 104 supports delivery of the associated event via a virtual wire message, and a PIN bit may indicate whether the chipset 104 supports delivery of the associated event via an event signal associated with a chipset pin 112. However, in other embodiments, each CAP field may comprise a different number of bits or may utilize a different encoding scheme to indicate supported delivery mechanisms.

Figure 3:
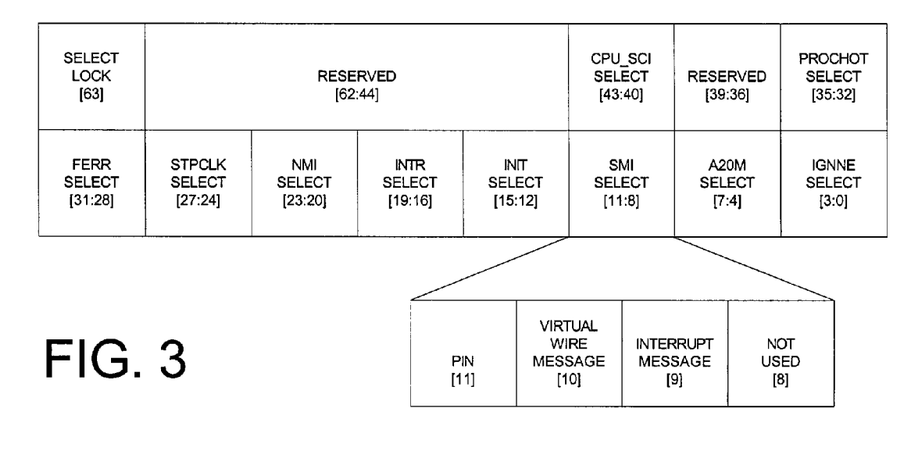
FIG. 3 illustrates an embodiment of a selection register of the computing device of FIG. 1.

Referring now to FIG. 3, an example embodiment of the chipset selection register 158 is illustrated. In the embodiment illustrated, the processor selection register 126 and the chipset selection register 158 have similar formats. However, in other embodiments, the processor selection register 126 may have a different format than the chipset selection register 158. Further, the processor selection register 126 may support all, some, or additional events than those supported by the chipset selection register 158, and the chipset selection register 158 may support all, some, or additional events than those supported by the processor selection register 126. The processor selection register 126 may further support all, some, or additional delivery mechanisms than those supported by the chipset selection register 158, and the chipset selection register 158 may support all, some, or additional delivery mechanisms than those supported by the processor selection register 126.

As illustrated, the selection register 158 may comprise a SELECT field for each event supported by the respective event handler 116, 148. In one embodiment, the selection register 158 may comprise an IGNNE SELECT field, an A20M SELECT field, a SMI SELECT field, an INIT SELECT field, an INTR SELECT field, an NMI SELECT field, a STPCLK SELECT field, a FERR SELECT field, a PROCHOT SELECT field, and a CPU_SCI SELECT field to respectively report chipset deliver selections for IGNNE events, A20M events, SMI events, INIT events, INTR events, NMI events, STPCLK events, FERR events, PROCHOT events, and CPU_SCI events.

In one embodiment, each SELECT field may comprise four bits which may be updated to select a delivery mechanisms for the associated event. A bit of a SELECT field may be set or updated to a logical "1" to select the corresponding delivery mechanism for the event and may be cleared or updated to a logical "0" to deselect the corresponding delivery mechanism for the event. In one embodiment, each SELECT field comprises a NOT USED bit, an INTERRUPT MESSAGE bit, a VIRTUAL WIRE MESSAGE bit, and a PIN bit. The NOT USED bit may be set to indicate that the associated event is not used, and the INTERRUPT MESSAGE bit may be set to select interrupt message delivery for the associated event. The VIRTUAL WIRE MESSAGE bit may be set to select virtual wire message delivery for the associated event, and the PIN bit may be set to select a pin delivery for the associated event. In other embodiments, the SELECT fields may comprise a different number of bits or may utilize a different encoding scheme to select a delivery mechanisms for the associated event.

The selection register 158 may further comprise a SELECT LOCK field to lock the chipset delivery selections and prevent inadvertent changes to the selections. In one embodiment, the selection register 158 is implemented as one or more read/write registers. However, in response to setting the SELECT LOCK field, the one or more selection register 158 function as one or more read-only registers. In one embodiment, the SELECT LOCK field is cleared upon a reset or a system shutdown, and no mechanism other than reset or system shutdown is provided for clearing the SELECT LOCK fields. Thus, in such an embodiment, a system shutdown or reset is required to change the selection register 158 once locked. In another embodiment, unlocking mechanisms such as, for example, an UNLOCK or CLEAR instruction may be provided to unlock and change the contents of the selection register 158 without a reset or cycling through a system shutdown. In yet another embodiment, the selection register 158 may not comprise a SELECT LOCK field and the computing device 100 may not provide for selection locking.

Figure 4:
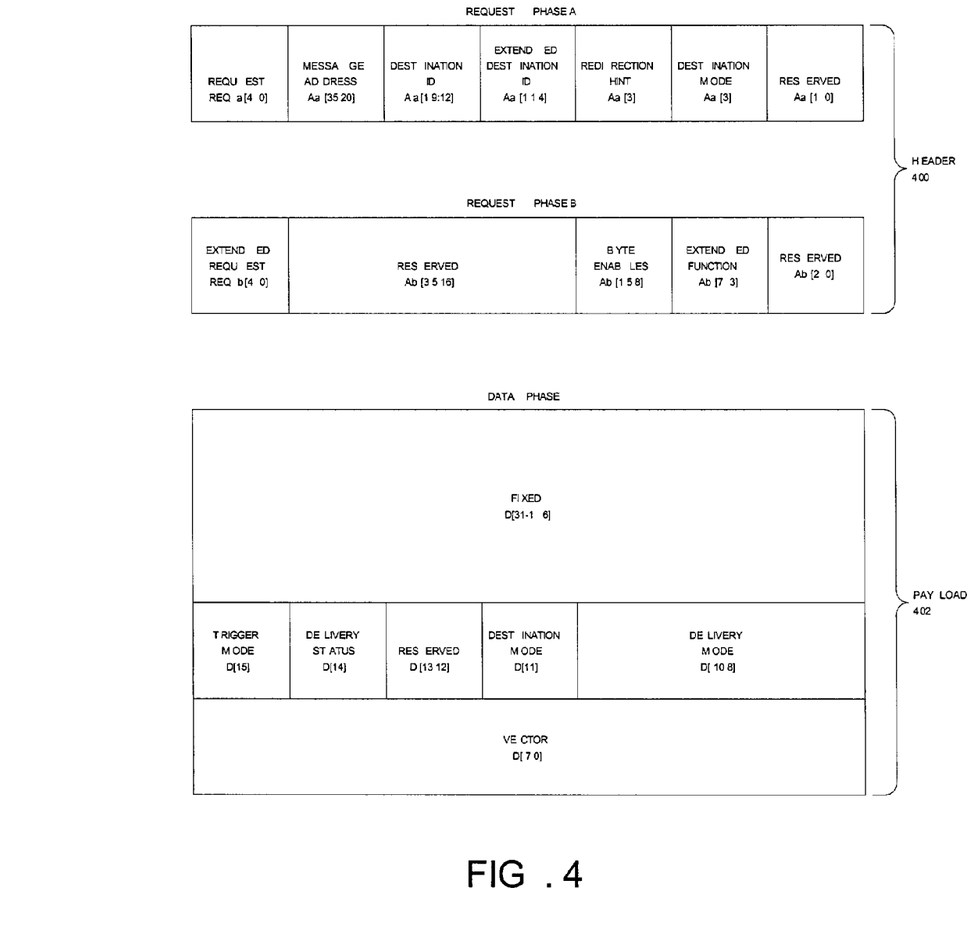
FIG. 4 illustrates an embodiment of a interrupt message of the computing device of FIG. 1.

Referring now to FIG. 4, there is shown an example embodiment of an interrupt message. The interrupt message may comprise a header 400 to indicate a message destination and a message type. The interrupt message may further comprise a payload 402 to report the occurrence of an interrupt event. As illustrated, the header 400 may be transferred during two request phases of the processor bus 106 which are referred to herein respectively as REQUEST PHASE A and REQUEST PHASE B. Further, the payload 402 may be transferred during a DATA PHASE of the processor bus 106. However, in another embodiment, the header 400 or payload 402 may be transferred between the chipset 104 and the processor 102 via another bus such as, for example, a 3-bit I/O APIC serial bus that is supported by some Intel Pentium processors. Further, the header 400 or payload 402 may be transferred during a different number of phases or different types of phases. In other embodiments, the header 400 or payload 402 may have a different format and may contain different information.

In one embodiment, the header 400 may by transferred over a 5-bit request (REQ) bus and a 36-bit address (A) bus of an Intel Pentium 4 processor bus 106 during a REQUEST PHASE A and a REQUEST PHASE B. The REQUEST PHASE A may comprise a REQUEST field, a MESSAGE ADDRESS field, a DESTINATION ID field, an EXTENDED DESTINATION ID field, a REDIRECTION HINT field, a DESTINATION MODE field, and a RESERVED field. The REQUEST PHASE B may comprise an EXTENDED REQUEST field, a BYTE ENABLES field, an EXTENDED FUNCTION field, and RESERVED fields.

The REQUEST field, the EXTENDED REQUEST field and the MESSAGE ADDRESS field in combination may indicate a transaction or message type. In one embodiment, the REQUEST field, the EXTENDED REQUEST field, and the MESSAGE ADDRESS field may be set to the values 01001_b, XX100_b, and 0FFEE_h respectively to indicate a message transaction (e.g. an interrupt message or a virtual wire message). Herein, a number with an appended "_b" is used herein to indicate a binary number, a number with an appended "_h" is used to indicate a hexadecimal number, and an "X" is used to indicate "DON'T CARE" or "UNUSED" bit or bits.

The DESTINATION ID field and the EXTENDED DESTINATION ID field may specify a processor 102 or a group of processors using various destination modes (e.g. physical destination mode, logical destination mode, flat mode, cluster mode) that effect the interpretation of the DESTINATION ID and the EXTENDED DESTINATION ID fields. The REDIRECTION HINT field in one embodiment may indicate whether the interrupt message may be redirected to a processor 102 that has a lower interrupt priority. Further, when the REDIRECTION HINT field indicates that the interrupt message may be redirected, the DESTINATION MODE field may be used to specify a destination mode (e.g. a physical mode, or a logical mode) for interpreting the DESTINATION ID and EXTENDED DESTINATION ID fields. In multi-processor systems, the REDIRECTION HINT field and the DELIVERY MODE field may be used to redirect interrupt messages for certain events to a less busy processor 102 selected from a group specified by the DESTINATION ID and EXTENDED DESTINATION ID fields.

The BYTE ENABLES field may indicate the valid portions of the data transferred during the data phase. In one embodiment, the BYTE ENABLES field is set to 0F_h to indicate that the lower 32 bits of the data phase contains valid data.

The payload 402 in one embodiment may comprise a FIXED field, a TRIGGER MODE field, a DELIVERY STATUS field, a RESERVED field, a DESTINATION MODE field, a DELIVERY MODE field, and a VECTOR field. The TRIGGER MODE field may indicate whether the interrupt event is level triggered or edge-triggered, and the DELIVERY STATUS field may indicate whether the interrupt event is asserted or deasserted. If edge-triggered, the interrupt controller 152 in one embodiment always sets the DELIVERY STATUS field to a logical "1" to indicate an asserted state for the edge-triggered interrupt event since the event handler 148 refrains from reporting the deasserted or negative edge of edge-triggered interrupt events.

The DESTINATION MODE field may indicate a destination mode such as, for example, a logical mode or a physical mode. In one embodiment, the processor event handler 116 may interpret the DESTINATION ID field and EXTENDED DESTINATION ID fields differently based upon the state of the DESTINATION MODE field. The DELIVERY MODE field may indicate an interrupt event type such as, for example, a fixed INTR event, a lowest priority INTR event, an INIT event, an SMI event, an NMI event, or an external INTR event. In one embodiment, a fixed INTR event indicates that the INTR event is to be delivered to each processor event handler 116 identified by the DESTINATION ID FIELD and EXTENDED DESTINATION ID field, whereas the lowest priority INTR event indicates that the INTR event is to be delivered to the lowest priority processor event handler 116.

The VECTOR field may identify a interrupt service routine that is to be executed in response to the associated interrupt event. Further, each bit of the RESERVED fields in one embodiment may be set 0_b. In another embodiment, each bit of the RESERVED fields is undefined and ignored. As a result, such bits may be set to any value without consequence.

In one embodiment, the BIOS 146 or operating system of the computing device 100 updates the control registers 130, 162 at system startup with values for each of the following interrupt message fields: the DESTINATION ID field, the EXTENDED DESTINATION ID field, the REDIRECTION HINT field, the DESTINATION MODE field, the TRIGGER MODE field, the DELIVERY STATUS field, the RESERVED field, the DESTINATION MODE field, the DELIVERY MODE field, and the VECTOR field. Accordingly, the interrupt controls 120, 152 may simply obtain these values from their control registers 130, 162 when constructing an interrupt message.

FIG. 4 also illustrates over which bus and bit lines of an Intel Pentium 4 processor bus 106 each field is transferred in one specific embodiment. As illustrated, REQa[X] indicates that the respective field is transferred over bit lines X of the request bus during REQUEST PHASE A. Similarly, REQb [Y] indicates that the respective field is transferred over bit lines Y of the request bus during REQUEST PHASE B. Further, Aa[Z] indicates that the respective field is transferred over bit lines Z of the address bus during REQUEST PHASE A. Similarly, Ab[W] indicates that the respective field is transferred over bit lines W of the address bus during REQUEST PHASE B. Further, D[N] indicates that the respective field is transferred over bit lines N of the data bus (D bus) during a data phase of the processor bus 106. A more detailed description of the header 400 and the payload 402 of one embodiment of the interrupt message can be found in the IA-32 Intel Architecture Software Developer's Manual (2001).

Figure 5:
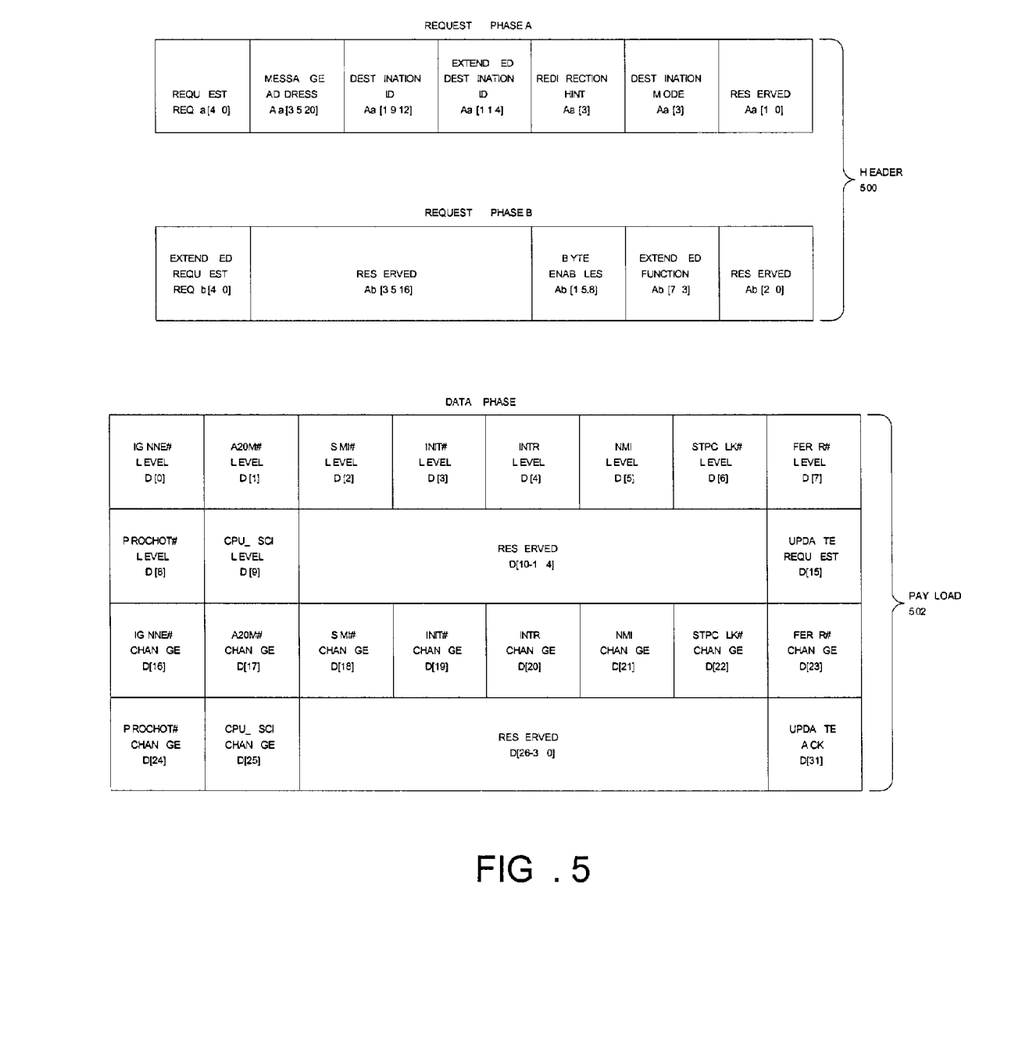
FIG. 5 illustrates an embodiment of a virtual wire message of the computing device of FIG. 1.

Referring now to FIG. 5, there is shown an example embodiment of a virtual wire message. The virtual wire message may comprise a header 500 to indicate a message destination and a message type. The virtual wire message may further comprise a payload 502 to report the occurrence of virtual wire events. As illustrated, the header 500 may be transferred during two request phases of the processor bus 106 such as, for example, REQUEST PHASE A and REQUEST PHASE B of an Intel Pentium 4 bus. Further, the payload 502 may be transferred during a data phase of the processor bus 106. However, in another embodiment, the header 500 or payload 502 may be transferred between the chipset 104 and the processor 102 via another bus such as, for example, a serial virtual wire bus (not shown). Further, the header 500 or payload 502 may be transferred during a different number phases or different types of phases. In other embodiments, the header 500 or payload 502 may have a different format and may contain different information.

In one embodiment, the header 500 may by transferred over a 5-bit request (REQ) bus and a 36-bit address (A) bus of an Intel Pentium 4 processor bus 106 during a REQUEST PHASE A and a REQUEST PHASE B. The REQUEST PHASE A may comprise a REQUEST field, a MESSAGE ADDRESS field, a DESTINATION ID field, an EXTENDED DESTINATION ID field, a REDIRECTION HINT field, a DESTINATION MODE field, and a RESERVED field. The REQUEST PHASE B may comprise an EXTENDED REQUEST field, a BYTE ENABLES field, an EXTENDED FUNCTION field, and RESERVED fields.

The REQUEST field, the EXTENDED REQUEST field and the MESSAGE ADDRESS field in combination may indicate a transaction or message type. In one embodiment, the REQUEST field, the EXTENDED REQUEST field, and the MESSAGE ADDRESS field may be set to the values 01001_b, XX100_b, and 0FFEE_h respectively to indicate a message transaction (e.g. an interrupt message or a virtual wire message).

The DESTINATION ID field and the EXTENDED DESTINATION ID field may specify a processor 102 or a group of processors using various destination modes (e.g. physical destination mode, logical destination mode, flat mode, cluster mode) that effect the interpretation of the DESTINATION ID and the EXTENDED DESTINATION ID fields. The REDIRECTION HINT field in one embodiment is used in combination with bits Ab[6:5] of the EXTENDED FUNCTION field to indicate a destination mode for the virtual wire message. For convenience, VWM MODE field is used to indicate the REDIRECTION HINT field concatenated with bits Ab[6:5] of the EXTENDED FUNCTION field. In one embodiment, the VWM Mode field indicates a physical destination mode when set to 010_b, a logical destination mode when set to 011_b, and a processor-to-chipset mode when set to 110_b.

The BYTE ENABLES field may indicate the valid portions of the data transferred during the data phase. In one embodiment, the BYTE ENABLES field is set to 0F_h to indicate that the lower 32 bits of the data phase contains valid data. Further, each bit of the RESERVED fields in one embodiment may be set 0_b. In another embodiment, each bit of the RESERVED fields is undefined and ignored.

In one embodiment, the header 500 may by transferred over a 5-bit request bus and a 36-bit address bus of an Intel Pentium 4 processor bus 106 during a REQUEST PHASE A and a REQUEST PHASE B. The REQUEST PHASE A may comprise a REQUEST field, a FIXED field, a DESTINATION ID field, an EXTENDED DESTINATION ID field, a REDIRECTION HINT field, a DESTINATION MODE field, and a RESERVED field. Further, the REQUEST PHASE B may comprise an EXTENDED REQUEST field, a DEBUG field, an ATTRIBUTE field, a DEFERRED ID field, a BYTE ENABLES field, an EXTENDED FUNCTION field, and a FIXED field.

The payload 502 in one embodiment may comprise a LEVEL field and a CHANGE field for each event. For example, the payload 502 may comprise a LEVEL field and a CHANGE field for each of the following IA-32 events: IGNNE, A20M, SMI, INIT, INTR, NMI, STPCLK, FERR, PROCHOT, and CPU_SCI. Each LEVEL field may indicate the status (e.g. asserted/deasserted) of the respective event, and each CHANGE field may indicate a change in level or status for the respect event since the previous virtual wire message.

The payload 502 may further comprise an UPDATE REQUEST field and an UPDATE ACK field. In one embodiment, the UPDATE REQUEST field may be updated (e.g. set to a logical "1") to indicate that the sender of the virtual wire message is requesting a virtual wire message be sent with current event status, and may be updated (e.g. cleared to a logical "0") to indicate that the sender of the virtual wire message is not requesting a virtual wire message update. Further, the UPDATE ACK field in one embodiment may be updated (e.g. set to a logical "1") to indicate that the virtual wire message is in response to an update request, and may be updated (e.g. cleared to a logical "0") to indicate that the virtual wire message is not in response to an update request. In one embodiment, the processor 102 may send a virtual wire message update request in response to awakening from a sleep state in order to obtain the current status of the events from the chipset 104.

The computing device 100 may support additional and/or alternative update mechanisms that cause the processor 102 and/or the chipset 104 to send virtual wire messages to update the status of the events in the processor 102 and the chipset 104. In one embodiment, the processor 102 and/or the chipset 104 may further comprise a bit or register which the BIOS 146, operating system, or other entity may update in order to request the processor 102 and/or the chipset 104 to send a virtual wire message. Similarly, the processor 102 and/or the chipset 104 may provide a command that requests the processor 102 and/or the chipset 104 to send a virtual wire message comprising current event status. In another embodiment, the processor 102 and/or chipset 104 may further provide a bit or register which the BIOS 146, operating system, or other entity may update in order to request the processor 102 and/or the chipset 104 to send at least one virtual wire message every period (e.g. 1 second) regardless of an event status change.

Figure 6:
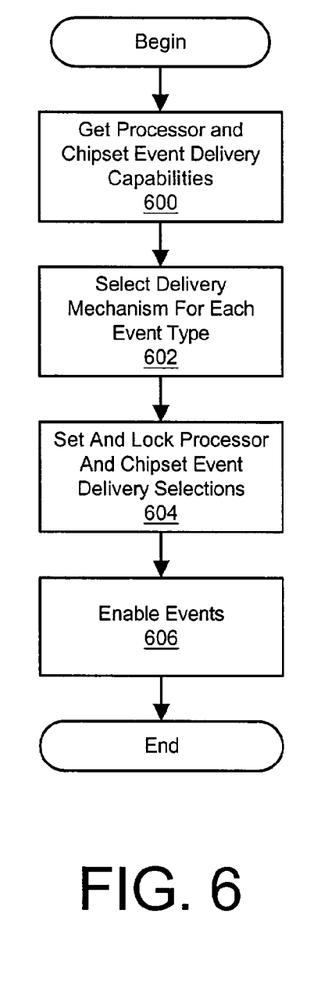
FIG. 6 illustrates an embodiment of an initialization method of the computing device of FIG. 1.

Referring now to FIG. 6, an embodiment of an event initialization method is illustrated. Events in one embodiment of the computing device 100 are disabled following a system reset and at system power-up. The BIOS 146 of the computing device 100 may program components of the computing device 100 for proper event handling before enabling events. For convenience, the following describes the BIOS 146 as performing certain actions; however, such actions in one embodiment are performed by the processor 102 in response to executing instructions of the BIOS 146.

As part of event initialization, the BIOS 146 may determine in block 600 the event delivery capabilities of the processor 102 and the chipset 104. In one embodiment, the BIOS 146 may access the processor capabilities register 124 and the chipset capabilities register 156 to obtain the event delivery capabilities.

In block 602, the BIOS 146 may select a delivery mechanism for each event. In one embodiment, each bit of the capabilities registers 124, 156 is set to a logical "1" if the associated delivery mechanism is supported. Accordingly, the BIOS 146 may perform a bit-wise AND of the capabilities registers 124, 156 to obtain a common capabilities value comprising for each event fields that indicate the common delivery mechanisms for the respective event. For example, the resulting fields of the common capabilities value may indicate: that the processor 102 and chipset 104 both support delivery of a first event via a virtual wire message or an event signal; that the processor 102 and chipset 104 both support delivery of a second event by an event signal; and that the processor 102 and chipset 104 do not share a common delivery mechanism for a third event.

If multiple common delivery mechanisms are available for an event, then the BIOS 146 may choose one of the delivery mechanisms using various selection criteria such as, for example, selecting based upon configuration option of the BIOS 146 or selecting based upon the least significant set bit of the associated field of the common capabilities value. If no common delivery mechanism is available, the BIOS 146 may generate an error message to indicate an invalid configuration. Alternatively, the BIOS 146 may continue with the initialization of the computing device 100 and may disable the event via the control registers 130, 162. Disabling the event may be acceptable if the computing device 100 does not need the event, and thus may provide a mechanism to phase-out legacy events that are no longer required or utilized by newer computing devices or software.

In block 604, the BIOS 146 may program the processor 102 and chipset 104 to use the selected delivery mechanisms and may lock the delivery selections to protect against inadvertent changes. In one embodiment, the BIOS 146 may program and lock the delivery selections by writing values to the selection registers 126, 158 that set a single bit of each SELECT field in order to indicate the delivery mechanism to be used for the respective event. Further, in one embodiment, the value written to the selection registers 126, 158 may lock the delivery selections by updating the SELECT LOCK fields.

After selecting the event delivery mechanisms, the BIOS 146 in 606 may enable events. In one embodiment, the BIOS 146 may enable events by updating the control registers 130, 162. However, as discussed above, the BIOS 146 may disable certain events that are not commonly supported by the processor 102 and the chipset 104, no common delivery mechanism).

Figure 7:
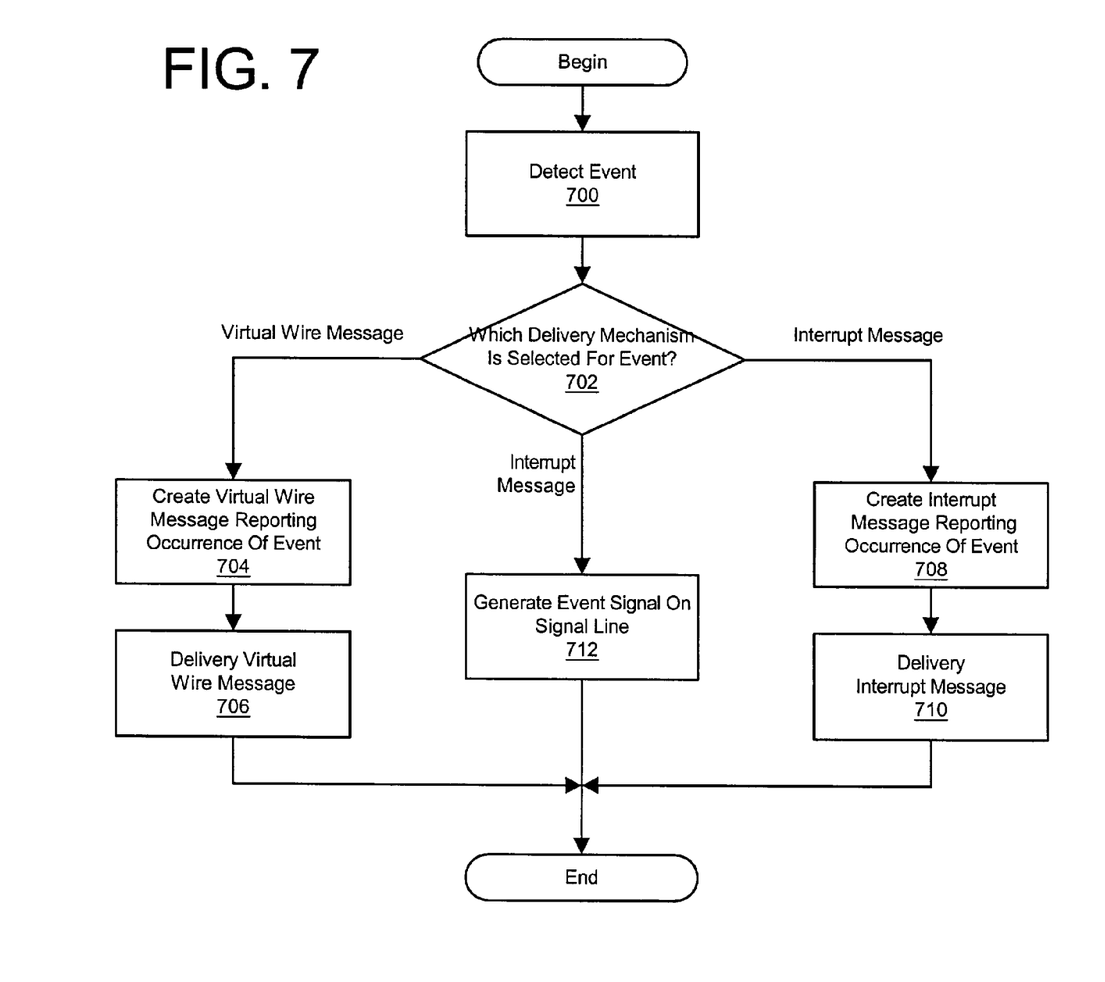
FIG. 7 illustrates an embodiment of an event delivery method of the computing device of FIG. 1.

Referring now to FIG. 7, an embodiment of an event delivery method is illustrated. The processor 102 and the chipset 104 may utilize a similar event delivery method. For convenience, the following describes the event delivery method from the perspective of the chipset 104 delivering events to the processor 102. However, it should be appreciated that the event delivery method may be implemented in a similar manner by the processor 102 to delivery events to the chipset 104. In block 700, the chipset event handler 148 may detect an event. For example, the chipset event handler 148 may detect an INTR event that was generated by the chipset 104 or by another component based upon the contents of the status register 160.

The chipset event handler 148 in block 702 may determine which delivery mechanism has been selected for the detected event. For example, in response to detecting an INIT event, the chipset event handler 148 may determine based upon the set bit of its INIT SELECT field whether to deliver the INIT event to the processor 102 via a virtual wire message, an interrupt message, or an event signal applied to a chipset INIT pin 112.

In response to determining that the event is to be delivered via a virtual wire message, the chipset event handler 148 may construct in block 704 a virtual wire message to report the status of the detected event. In one embodiment, the virtual wire message unit 150 of the event handler 148 may construct a virtual wire message having a header 500 that provides a message destination and a message type and a payload 502 that provides event status.

The virtual wire message unit 150 in one embodiment may obtain values for the various fields of the header 500 from information stored in event control register 162 of the chipset 104 which the BIOS 146 or operating system may program during system initialization. In another embodiment, the virtual wire message unit 150 may simply construct the header 500 of the virtual wire message to comprise a broadcast identifier that causes the virtual wire message to be delivered to all processors 102 of the computing device 100. In another embodiment, the virtual wire message unit 150 may be hard-wired to generate the header 500 such that virtual wire messages are broadcast to all processors 102. Further, in uni-processor computing devices 100 the virtual wire message may contain no destination identifier since only one possible destination for the message exists.

In one embodiment, the virtual wire message unit 150 may further create the payload 502 of the virtual wire message based upon the event registers 154 of the chipset 104. In one embodiment, the virtual wire message unit 150 based upon the event status register 160 may determine which events changed since the previous virtual wire message and may determine a signal level associated with each event. In one embodiment, the virtual wire message unit 150 may determine that an event is edge-triggered based upon the control register 162 and may report a first edge of such edge-triggered events such as, for example, a low to high signal level transition or a positive edge. The virtual wire message unit 150 may refrain from reporting a second edge of the such edge-triggered events such as, for example, a high to low signal level transition or negative edge.

The chipset event handler 148 in block 706 may send the constructed virtual wire message to the processor 102. In one embodiment, the virtual wire message unit 150 may send the virtual wire message by transferring the message to one or more processors 102 via the processor bus interface 140 and the processor bus 106. In another embodiment, the virtual wire message unit may transfer the virtual wire message to one or more processors 102 via a virtual wire message bus (not shown) that is separate from the processor bus 106.

In response to determining that the event is to be delivered via an interrupt message, the chipset event handler 148 may construct in block 708 an interrupt message to report the status of the detected event. In one embodiment, the interrupt controller 152 of the chipset event handler 148 may construct an interrupt message having a header 400 that indicates a processor 102 or a group of processors 102 to which to deliver a payload 402 that indicates interrupt event status.

The interrupt controller 152 in one embodiment may create the header 400 and payload 402 of the interrupt message based upon information stored in the chipset event registers 154. In one embodiment, the BIOS 146 or operating system of the computing device 100 may program the chipset control register 162 with appropriate header or payload information during system initialization. For example, the BIOS 146 or operating system may program the chipset control register 162 with event type and interrupt vector information during system initialization. Further, the chipset event handler 148 or operating system of the computing device 100 may update the chipset status registers 160 to indicate the current status of interrupt events.

The chipset event handler 148 in block 710 may send the constructed interrupt message to the processor 102. In one embodiment, the interrupt controller 152 may send the interrupt message by transferring the message to one or more processors 102 via the processor bus interface 140 and the processor bus 106. In another embodiment, the interrupt controller 152 may transfer the interrupt message to one or more processors 102 via an interrupt message bus (not shown) that is separate from the processor bus 106.

In response to determining that the event is to be delivered via an event signal, the chipset event handler 148 in block 712 may apply an event signal to a chipset 112 to indicate the event status. In one embodiment, the interrupt controller 152 of the chipset event handler 148 may apply an event signal to a event signal line 108 via one of its pins 112 thus causing an associated pin 110 of the processor 102 to receive the event signal. For example, the chipset interrupt controller 152 may detect based upon its status register 160 that three INTR events are pending. The chipset interrupt controller 152 may generate an INTR signal on its INTR pin 112 thus causing an associated INTR event signal line 108 to propagate and apply the INTR event signal to a processor INTR pin 110. The processor 102 may later query the interrupt controller 152 to obtain the interrupt vector of the interrupt handler routine associated with the highest priority event needing service.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. An apparatus comprising
    a pin to transfer event signals associated with an event,
    a bus interface to transfer bus messages via a bus,
    a selection register to select a delivery mechanism for the event, and
    an event handler to handle the event via a virtual wire message of the bus in response to the selection register selecting virtual wire message delivery for the event and to handle the event via an event signal of the pin in response to the selection register selecting pin delivery for the event.

2. The apparatus of claim 1 further comprising a capabilities register to indicate supported event delivery mechanisms.

3. The apparatus of claim 1 wherein the selection register comprises a lock field to enable locking of the selection register from further updates.

4. The apparatus of claim 1 wherein the event handler is to handle the event via an interrupt message of the bus in response to the selection register selecting interrupt message delivery for the event.

5. The apparatus of claim 1 wherein the event comprises a floating point error event.

6. The apparatus of claim 1 wherein the event comprises an ignore number error event.

7. The apparatus of claim 1 wherein the event comprises a thermal event error event.

8. The apparatus of claim 1 wherein the event comprises a power saving event.

9. The apparatus of claim 1 wherein the event handler is part of a processor and the event comprises a system control interrupt asserted by the event handler.

10. A method comprising
    determining event delivery mechanisms that are commonly supported by the processor and chipset, and
    selecting an event delivery mechanism for an event based upon the commonly supported event delivery mechanisms of the processor and the chipset.

11. The method of claim 10 further comprising
    accessing a capabilities register of the processor to determine which event delivery mechanisms are supported by the processor, and
    accessing a capabilities register of the chipset to determine which event delivery mechanisms are supported by the chipset.

12. The method of claim 11 further comprising
    updating a selection register of the processor to select the event delivery mechanism for the event, and
    updating a selection register of the chipset to select the event delivery mechanism for the event.

13. The method of claim 12 further comprising
    locking the selection register of the processor to protect against further updates to the selection register of the processor, and
    locking the selection register of the chipset to protect against further updates to the selection register of the chipset.

14. The method of claim 10 further comprising
    selecting event delivery mechanisms for a plurality of events based upon the commonly supported event delivery mechanisms.

15. The method of claim 10 further comprising
    delivering the event via an event signal associated with pins of the processor and the chipset in response to selecting pin delivery for the event,
    delivering the event via an interrupt message in response to selecting interrupt message delivery for the event, and
    delivering the event via a virtual wire message in response to selecting virtual wire message delivery for the event.

16. The method of claim 10 further comprising
    delivering the event via an event signal associated with pins of the processor and the chipset in response to selecting pin delivery for the event, and
    delivering the event via a virtual wire message in response to selecting virtual wire message delivery for the event.

17. The method of claim 10 further comprising
    requesting the chipset to send a virtual wire message that provides status of the event in the chipset.

18. The method of claim 17 further comprising
requesting the processor to send a virtual wire message that provides status of the event in the processor.

19. The method of claim 10 further comprising
requesting the chipset to periodically send a virtual wire message that provides status of the event in the chipset.

20. The method of claim 19 further comprising
requesting the processor to periodically send a virtual wire message that provides status of the event in the processor.

21. A tangible machine-readable medium comprising a plurality of instructions that in response to being executed by a computing device results in the computing device
determining event delivery mechanisms supported by a processor,
determining event delivery mechanisms supported by the chipset, and
selecting an event delivery mechanism for each of a plurality of events based upon the commonly supported event delivery mechanisms of the processor and the chipset.

22. The tangible machine-readable medium of claim 21 wherein the plurality of instructions, in response to being executed by the computing device, further results in the computing device
accessing one or more capabilities registers of the processor to determine the event delivery mechanisms supported by the processor, and
accessing one or more capabilities registers of the chipset to determine the event delivery mechanisms supported by the chipset.

23. The tangible machine-readable medium of claim 22 wherein the plurality of instructions, in response to being executed by the computing device, further results in the computing device
updating one or more selection registers of the processor to select the event delivery mechanisms for the plurality of events, and
updating one or more selection registers of the chipset to select the event delivery mechanisms for the plurality of events.

24. The tangible machine-readable medium of claim 23 wherein the plurality of instructions, in response to being executed by the computing device, further results in the computing device
locking the one or more selection registers of the processor to protect against further updates to the one or more selection registers of the processor, and
locking the one or more selection registers of the chipset to protect against further updates to the one or more selection register of the chipset.

25. The tangible machine-readable medium of claim 21 wherein the plurality of instructions, in response to being executed by the computing device, further results in the computing device
selecting between pin delivery and virtual wire message delivery for each of the plurality of events based upon the common delivery mechanisms of the processor and the chipset.

26. The tangible machine-readable medium of claim 21 wherein the plurality of instructions, in response to being executed by the computing device, further results in the computing device
selecting among pin delivery, virtual wire message delivery, and interrupt message delivery for each of the plurality of events based upon the common deliver mechanisms of the processor and the chipset.

27. A system comprising
a processor comprising a bus interface to receive a virtual wire message and an event handler to decode the virtual wire message received via the bus interface,
a chipset comprising a bus interface to send the virtual wire message and an event handler to construct the virtual wire message to report status of a plurality of events,
a bus to couple the bus interface of the processor to the bus interface of the chipset and to carry virtual wire messages therebetween, and
firmware that, in response to being executed by the processor, results in the processor for each event selecting between pin delivery and virtual wire message delivery.

28. The system of claim 27 wherein
the plurality of events of the virtual wire message comprises an INTR event associated with normal interrupts,
the processor lacks an INTR pin to receive an INTR event signal reporting status of the INTR event, and
the chipset lacks an INTR pin to send the INTR event signal.

29. The system of claim 27 wherein
the plurality of events of the virtual wire message comprises an NMI event associated with non-maskable interrupts,
the processor lacks an NMI pin to receive an NMI event signal reporting status of the NMI event, and
the chipset lacks an NMI pin to send an NMI event signal.

30. The system of claim 27 wherein
the plurality of events of the virtual wire message comprises an SMI event associated with system management interrupts,
the processor lacks an SMI pin to receive an SMI event signal reporting status of the SMI event, and
the chipset lacks an SMI pin to send an SMI event signal.

31. The system of claim 27 wherein
the plurality of events of the virtual wire message comprises an INIT event associated with processor initialization,
the processor lacks an INIT pin to receive an INIT event signal reporting status of the INIT event, and
the chipset lacks an INIT pin to send an INIT event signal.

32. The system of claim 27 wherein
the plurality of events of the virtual wire message comprises a STPCLK event associated with a processor power reduced state,
the processor lacks an STPCLK pin to receive an STPCLK event signal reporting status of the STPCLK event, and
the chipset lacks an STPCLK pin to send an STPCLK event signal.

33. The system of claim 27 wherein
the plurality of events of the virtual wire message comprises an PROCHOT event associated with processor throttling,
the processor lacks an PROCHOT pin to receive an PROCHOT event signal reporting status of the PROCHOT event, and
the chipset lacks an PROCHOT pin to send an PROCHOT event signal.

34. The system of claim 27 wherein
the plurality of events of the virtual wire message comprises an A20M event associated with masking an A20M signal line of the bus, the processor lacks an A20M pin to receive an A20M event signal reporting status of the A20M event, and the chipset lacks an A20M pin to send an A20M event signal.

35. The system of claim 27 wherein the processor and chipset each comprise a plurality of event pins.

36. The system of claim 27 wherein the chipset sends the processor the virtual wire message in response to a request.

37. The system of claim 27 wherein the chipset periodically sends the processor the virtual wire message regardless of an event status change.

* * * * *